United States Patent
Park et al.

(10) Patent No.: US 9,951,216 B2
(45) Date of Patent: *Apr. 24, 2018

(54) THERMOPLASTIC RESIN COMPOSITION HAVING IMPROVED WEATHER RESISTANCE

(71) Applicant: LOTTE ADVANCED MATERIALS CO., LTD., Yeosu-si (KR)

(72) Inventors: Ji Eun Park, Uiwang-si (KR); Kyun Ha Ban, Uiwang-si (KR); Ja Yoon Kim, Uiwang-si (KR); Chang Min Hong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/630,260

(22) Filed: Jun. 22, 2017

(65) Prior Publication Data

US 2017/0283582 A1 Oct. 5, 2017

Related U.S. Application Data

(63) Continuation of application No. 14/520,449, filed on Oct. 22, 2014.

(30) Foreign Application Priority Data

Oct. 30, 2013 (KR) .................. 10-2013-0130314
Oct. 16, 2014 (KR) .................. 10-2014-0139878

(51) Int. Cl.
| | | |
|---|---|---|
| C08L 25/12 | (2006.01) | |
| C08K 3/22 | (2006.01) | |
| C08K 5/00 | (2006.01) | |
| C08L 25/16 | (2006.01) | |
| C08L 51/00 | (2006.01) | |
| C08L 51/04 | (2006.01) | |
| C08K 3/00 | (2018.01) | |

(52) U.S. Cl.
CPC ............. *C08L 25/12* (2013.01); *C08K 3/22* (2013.01); *C08K 5/0041* (2013.01); *C08L 25/16* (2013.01); *C08L 51/003* (2013.01); *C08K 3/0033* (2013.01); *C08L 51/04* (2013.01); *C08L 2205/02* (2013.01); *C08L 2205/035* (2013.01); *C08L 2207/04* (2013.01)

(58) Field of Classification Search
CPC ...... C08K 3/22; C08K 5/0041; C08K 3/0033; C08L 25/16; C08L 51/003; C08L 51/04; C08L 25/12; C08L 2205/035; C08L 2205/02; C08L 2207/04
USPC ........................................................ 524/504
See application file for complete search history.

(56) References Cited

U.S. PATENT DOCUMENTS

| | | |
|---|---|---|
| 4,524,166 A | 6/1985 | Spivack et al. |
| 4,774,287 A | 9/1988 | Shimozato et al. |
| 4,824,907 A | 4/1989 | Coster |
| 5,423,912 A | 6/1995 | Sullivan et al. |
| 5,472,491 A | 12/1995 | Duschek et al. |
| 5,759,255 A | 6/1998 | Venturini et al. |
| 5,889,111 A | 3/1999 | McKee et al. |
| 6,280,837 B1 | 8/2001 | Mitzutani et al. |
| 7,019,048 B2 | 3/2006 | Brehm et al. |
| 7,619,031 B2 | 11/2009 | Kanayama et al. |
| 7,728,056 B2 | 6/2010 | Kuvshinnikova et al. |
| 8,691,138 B2 | 4/2014 | Kang et al. |
| 2002/0096087 A1 | 7/2002 | Glausch |
| 2006/0223932 A1 | 10/2006 | Kieser et al. |
| 2007/0276083 A1 | 11/2007 | Higashi et al. |
| 2010/0089291 A1 | 4/2010 | Kang et al. |
| 2011/0160343 A1 | 6/2011 | Son et al. |
| 2012/0046408 A1 | 2/2012 | Minkwitz |
| 2012/0264869 A1 | 10/2012 | Lee et al. |
| 2012/0270988 A1 | 10/2012 | Lee et al. |
| 2013/0172468 A1 | 7/2013 | Kim et al. |
| 2013/0172485 A1 | 7/2013 | Jin et al. |
| 2015/0011709 A1 | 1/2015 | Ahn et al. |
| 2015/0119508 A1 | 4/2015 | Park et al. |

FOREIGN PATENT DOCUMENTS

| | | |
|---|---|---|
| CN | 1369517 A1 | 9/2002 |
| CN | 101171287 A | 4/2008 |
| CN | 101336268 A | 12/2008 |
| CN | 103183950 A2 | 7/2013 |
| CN | 103183951 A | 7/2013 |
| EP | 0342533 A1 | 11/1989 |
| EP | 2610293 A1 | 7/2013 |
| JP | 61-241333 | 10/1986 |
| JP | 61-252224 A | 11/1986 |
| JP | 1989-292067 A | 11/1989 |
| JP | 1995-18199 A | 1/1995 |

(Continued)

OTHER PUBLICATIONS

Search Report in counterpart European Application No. 14190840.0 dated Jan. 28, 2015, pp. 1-6.
Office Action in counterpart Chinese Application No. 201410601502X dated Oct. 10, 2016, pp. 1-8.
European Search Report in commonly owned European Application No. 12199529.4 dated Apr. 23, 2013, pp. 1-4.

(Continued)

*Primary Examiner* — Angela C Scott
(74) *Attorney, Agent, or Firm* — Additon, Higgins & Pendleton, P.A.

(57) ABSTRACT

A thermoplastic resin composition having improved weather resistance includes an acrylic graft copolymer, an aromatic vinyl-vinyl cyanide copolymer, and a coloring agent including an inorganic pigment and an organic pigment mixed with each other at a predetermined ratio to maintain mechanical properties of the resin and have improved color mixing ability and weather resistance.

18 Claims, 1 Drawing Sheet

(56) References Cited

FOREIGN PATENT DOCUMENTS

| | | |
|---|---|---|
| JP | 1995-268241 A | 10/1995 |
| JP | 09-183918 | 7/1997 |
| JP | 1997-255891 A | 8/1997 |
| JP | 10-310721 | 11/1998 |
| JP | 2000-505833 A | 5/2000 |
| JP | 2002-192575 | 7/2002 |
| JP | 2002-194247 A | 7/2002 |
| JP | 2006-083269 A | 3/2006 |
| JP | 2009-067970 A | 4/2009 |
| JP | 2009-215509 A | 9/2009 |
| JP | 2013-064164 A | 4/2013 |
| KR | 5105677 B | 4/2003 |
| KR | 10-2005-0056187 A | 6/2005 |
| KR | 10-2006-0056986 A | 5/2006 |
| KR | 10-2006-0104109 A | 10/2006 |
| KR | 10-2006-0116668 A | 11/2006 |
| KR | 10-0788042 B1 | 12/2007 |
| KR | 10-2008-0082962 A | 9/2008 |
| KR | 10-2011-0057415 A | 6/2011 |
| KR | 10-2011-0079466 A | 7/2011 |
| KR | 10-2013-0075812 A | 7/2013 |
| KR | 10-2013-0078748 A | 7/2013 |
| WO | 2009/115249 A1 | 9/2009 |
| WO | 2011/010812 A1 | 1/2011 |
| WO | 2013/100448 A1 | 7/2013 |

OTHER PUBLICATIONS

Search Report in commonly owned Chinese Application No. 201210591141.6 dated Jul. 28, 2014, pp. 1-3.

Bamfield, et al., "Chromic Phenomena—Technological Applications of Colour Chemistry", 2nd Edition, 2.4.1 Organic Pigments, pp. 180-189, Royal Society of Chemistry, Online version available at: http://app.knovel.com/hotlink/pdf/id:kt00BZDNN1/chromic-phenomena-technological/quinacirdones.

Black Pearls 880 Carbon Black Data Sheet, 2004, pp. 1.

Office Action in counterpart Korean Application No. 10-2014-0139878 dated Oct. 19, 2016, pp. 1-7.

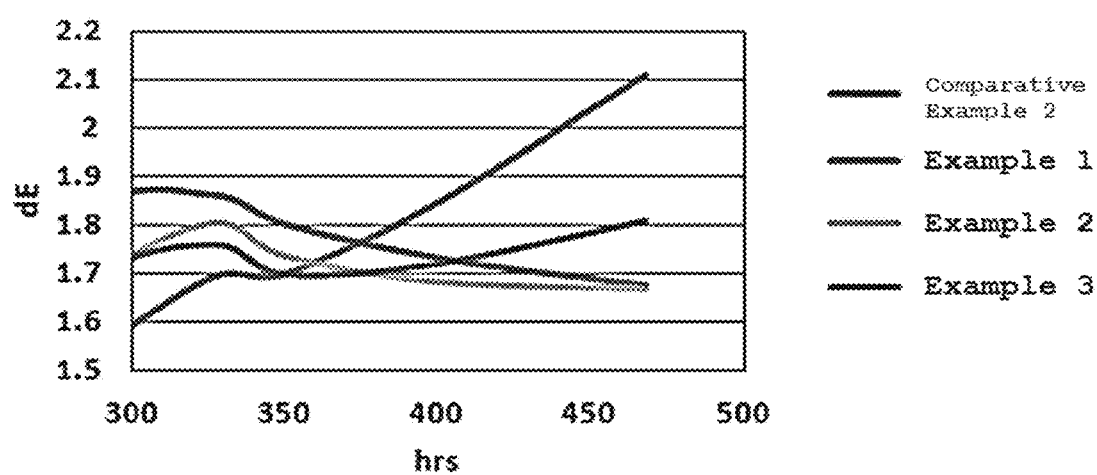

THERMOPLASTIC RESIN COMPOSITION HAVING IMPROVED WEATHER RESISTANCE

CROSS-REFERENCE TO RELATED APPLICATIONS

This application is a continuation of U.S. application Ser. No. 14/520,449, filed on Oct. 22, 2014, pending, and claims priority under 35 U.S.C. § 119 to Korean Patent Application No. 10-2013-0130314, filed on Oct. 30, 2013, and Korean Patent Application No. 10-2014-0139878, filed on Oct. 16, 2014, in the Korean Intellectual Property Office, the disclosure of each of which is incorporated herein by reference in its entirety.

FIELD OF THE INVENTION

The following disclosure relates to a thermoplastic resin composition that can have improved weather resistance and pigment colorability while maintaining mechanical properties of the resin.

BACKGROUND

In general, acrylonitrile-butadiene-styrene resin (hereinafter, referred to as an 'ABS resin') has been widely used in electric/electronic products, automobile components, general goods, and the like, due to excellent impact resistance, mechanical strength, surface property, workability, and the like.

However, ABS resin includes a chemically unstable double bond in a rubber component in the resin, such that aging of the rubber component may easily occur upon exposure to ultraviolet rays. Since the ABS resin has poor weather resistance and light resistance, when a product made of the ABS resin is left outside for a long period of time, discoloration and deterioration of physical properties are relatively significantly increased over time, such that the ABS resin is not suitable for outdoor usage.

To overcome this problem, post-production processes such as plating or coating can be performed on a molded article manufactured of the ABS resin, or a large amount of a UV stabilizer can be added when extruding the ABS resin. However, the former case has disadvantages in that such processes can be complicated, and defect rates can be high. The latter case also has disadvantages such as increased manufacturing costs and unsatisfactory long term weather resistance.

In order to overcome such limitations of uses for ABS resin, various resins having excellent weather resistance have replaced ABS resin. For example, acrylate-styrene-acrylonitrile resin (hereinafter, referred to as an 'ASA' resin) has been widely used as a substitute for ABS resin in outdoor applications. ASA resin has excellent weather resistance, light resistance, chemical resistance, thermal resistance, and the like, and is appropriate for use in outdoor exterior materials that are exposed to sunlight, such as outdoor electric/electronic products, automobile exterior materials, building materials, and the like.

When used for automobile interior and exterior materials, optimal color mixing and excellent weather resistance for aesthetic appearance are required in black-based colors which are mainly used. In a related art, there has been research into technology for improving weather resistance by using an inorganic material having low reactivity, or improving colorability of a base resin, or adding an additive helping dispersion of pigments. However, using a large amount of inorganic pigments or additives can decrease mechanical properties of the resin, such as impact strength, and the like.

Korean Patent Laid-Open Publication No. 10-2013-0075812 discloses an ASA resin composition containing an acrylic graft copolymer; two different kinds of vinyl cyanide-aromatic vinyl copolymers, each having different weight average molecular weight; and an alpha methyl styrene-based terpolymer. However, in this case, there are still problems in that pigment colorability can be decreased and weather resistance may not be sufficiently improved.

SUMMARY

An embodiment of the present invention is directed to providing a thermoplastic resin composition that can have improved pigment colorability and weather resistance. For example, in exemplary embodiments, there is provided a thermoplastic resin composition that can have improved weather resistance including an acrylic graft copolymer, an aromatic vinyl-vinyl cyanide copolymer, and a coloring agent including an inorganic pigment and an organic pigment mixed with each other at a predetermined ratio to be capable of having excellent pigment colorability and color mixing ability, controlling a "b" value of chromaticity values to decrease dE, to thereby provide improved weather resistance.

Another embodiment of the present invention is directed to providing a molded article capable of maintaining excellent weather resistance even during outdoor exposure for a long time with minimal or no effect on physical properties such as a mechanical properties, from the thermoplastic resin composition for improving weather resistance.

In exemplary embodiments, the present invention provides a thermoplastic resin composition for improving weather resistance including: (A) an acrylic graft copolymer; (B) an aromatic vinyl-vinyl cyanide copolymer; and (C) a coloring agent including an inorganic pigment and an organic pigment, wherein a "b" value of the composition determined in accordance with the following Equation 1 is controlled to improve weather resistance depending on a mixing ratio of the inorganic pigment and the organic pigment of the coloring agent (C), $$dE=\sqrt{(dL)^2+(da)^2+(db)^2} \qquad \text{[Equation 1]}$$

wherein, in Equation 1, dL is a variation of luminance, da is a variation of red green values, and db is a variation of yellow blue values, all of which are measured by a spectrophotometer.

The thermoplastic resin composition for improving weather resistance may further include: (D) carbon black.

The thermoplastic resin composition may include the coloring agent (C) in an amount of about 0.1 to about 1 part by weight based on about 100 parts by weight of a base resin including about 30 to about 70 wt % of the acrylic graft copolymer (A) and about 70 to about 30 wt % of the aromatic vinyl-vinyl cyanide copolymer (B).

The thermoplastic resin composition may include the coloring agent (C) in an amount of about 0.1 to about 1 part by weight and the carbon black (D) in an amount of about 1 to about 5 parts by weight, based on about 100 parts by weight of a base resin including about 30 to about 70 wt % of the acrylic graft copolymer (A) and about 70 to about 30 wt % of the aromatic vinyl-vinyl cyanide copolymer (B).

The acrylic graft copolymer (A) may be an acrylonitrile-styrene-acrylate graft copolymer (g-ASA) obtained by graft-polymerization of about 40 to about 60 wt % of an acrylic rubber-like polymer and about 40 to about 60 wt % of a mixture including an aromatic vinyl-based compound and a vinyl cyanide-based compound.

The aromatic vinyl-vinyl cyanide copolymer (B) may include at least one selected from the group consisting of a styrene-acrylonitrile copolymer, an α-methyl styrene-acrylonitrile copolymer, and/or a styrene-α-methyl styrene-acrylonitrile copolymer.

The carbon black (D) may have an average particle size of about 10 to about 50 nm, and a specific surface area of about 100 to about 300 $m^2/g$.

The carbon black (D) may be a masterbatch including about 30 to about 70 wt % of the aromatic vinyl-vinyl cyanide copolymer and about 30 to about 70 wt % of the carbon black mixed with each other.

The mixing ratio between the inorganic pigment and the organic pigment of the coloring agent (C) may be a weight ratio of about 1:1 to about 1:4.

The inorganic pigment may include at least one selected from the group consisting of oxides including metal elements selected from Fe, Cr, Mn, Cu, Co and/or Ni, titanium oxide, zinc oxide, aluminum metal powder, copper metal powder and/or stainless steel powder. The organic pigment may include at least one selected from the group consisting of anthraquinone pigments, perylene pigments, phthalocyanine pigments, azo pigments, indigo pigments, dioxazine pigments, quinacridone pigments, isoindolinone pigments, and/or phthalone pigments.

In other exemplary embodiments, the present invention provides a molded article manufactured from the thermoplastic resin composition for improving weather resistance as described above.

When a ratio between an inorganic pigment and an organic pigment is represented by the following Equation 2, the following Equations 3 to 5 may be simultaneously satisfied:

$$0.25 \leq P_I/P_O \leq 1.0 \quad \text{[Equation 2]}$$

wherein in Equation 2, $P_I$ is a content (amount) of the inorganic pigment (parts by weight), and $P_O$ is a content (amount) of the organic pigment (parts by weight)), $$dL = |La - Lb| \leq 1.5 \quad \text{[Equation 3]}$$

$$da = |Aa - Ab| \leq 1.5 \quad \text{[Equation 4]}$$

$$db = |Ba - Bb| \leq 2.0 \quad \text{[Equation 5]}$$

wherein in Equation 3, La is an "L" value measured by a spectrophotometer after a weather resistance test and Lb is an "L" value measured by a spectrophotometer before a weather resistance test, in Equation 4, Aa is an "a" value measured by a spectrophotometer after a weather resistance test and Ab is an "a" value measured by a spectrophotometer before a weather resistance test, and in Equation 5, Ba is a "b" value measured by a spectrophotometer after a weather resistance test and Bb is a "b" value measured by a spectrophotometer before a weather resistance test.

A "dE" value of the following Equation 1 may be less than about 3:

$$dE = \sqrt{(dL)^2 + (da)^2 + (db)^2} \quad \text{[Equation 1]}$$

wherein in Equation 1, dL is a variation of luminance, da is a variation of red green values, and db is a variation of yellow blue values, all of which are measured by a spectrophotometer.

BRIEF DESCRIPTION OF THE DRAWING

FIG. 1 is a graph showing results for a weather resistance test conducted for about 450 hours on thermoplastic resin compositions according to exemplary embodiments of the present invention and on a comparative thermoplastic resin composition.

DETAILED DESCRIPTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

Hereinafter, a thermoplastic resin composition that can have improved weather resistance according to exemplary embodiments of the present invention will be described in detail. The exemplary embodiments of the present invention described below are provided by way of example so that the idea of the present invention can be sufficiently transferred to those skilled in the art to which the present invention pertains. Herein, unless technical and scientific terms used herein are defined otherwise, they have meanings understood by those skilled in the art to which the present invention pertains. Known functions and components which obscure the description and the accompanying drawings of the present invention with unnecessary detail will be omitted.

The present inventors made an effort to develop a thermoplastic resin composition having improved pigment colorability and weather resistance, and as a result, found that a composition including an acrylic graft copolymer, an aromatic vinyl-vinyl cyanide copolymer, and a coloring agent including an inorganic pigment and an organic pigment mixed with each other at a predetermined ratio, such that chromaticity "b" value is adjusted to decrease dE, can exhibit improved weather resistance and maintain excellent weather resistance for a long period of time. In addition, the present inventors found that the thermoplastic resin composition can further include masterbatch type carbon black, such that dispersibility of pigment may be improved to provide improved pigment colorability and color mixing ability, thereby completing the present invention.

The thermoplastic resin composition that can have improved weather resistance may include an acrylic graft copolymer (A), an aromatic vinyl-vinyl cyanide copolymer (B), and a coloring agent including an inorganic pigment and an organic pigment (C).

Hereinafter, each component will be described in more detail.

(A) Acrylic Graft Copolymer

An acrylic graft copolymer according to an exemplary embodiment of the present invention may improve impact strength and pigment colorability by a combination with other components in a composition.

The acrylic graft copolymer of the present invention may be a core-shell copolymer, wherein the core is an acrylic rubber-like polymer, and the shell includes an aromatic vinyl-based compound and a vinyl cyanide-based compound. The core-shell graft copolymer may be prepared by graft-polymerization of an acrylic rubber-like copolymer and a mixture including an aromatic vinyl-based compound and a vinyl cyanide-based compound. The polymerization method is not limited and conventional polymerization methods known in the art may be used. Examples of the polymerization may include mass polymerization, suspension polymerization, and emulsion polymerization.

As an example thereof, the acrylic graft copolymer may be prepared by graft-polymerization of about 40 to about 60 wt % of a mixture including an aromatic vinyl-based compound and a vinyl cyanide-based compound in the presence of about 40 to about 60 wt % of an acrylic rubber-like polymer, using emulsion polymerization.

Here, the acrylic rubber-like polymer may be alkyl acrylate-based rubber and/or a copolymer of alkyl acrylate-based rubber and aromatic vinyl-based compound. For example, the acrylic rubber-like polymer may be (C2-C10)alkyl acrylate and/or a copolymer of (C2-C10)alkyl acrylate and a styrene monomer.

In addition, the acrylic rubber-like polymer may have an average particle size of about 0.1 to about 0.5 μm. When the acrylic rubber-like polymer has an average particle size of about 0.1 to about 0.5 μm, impact resistance and pigment colorability may be improved.

When the average particles size is less than about 0.1 μm, impact strength may be decreased, and when the average particle size is more than about 0.5 μm, pigment colorability may be deteriorated.

The mixture including the vinyl cyanide-based compound and the aromatic vinyl-based compound copolymerized in the acrylic rubber-like polymer may include about 20 to about 30 wt % of vinyl cyanide-based compound and about 70 to about 80 wt % of aromatic vinyl-based compound.

Examples of the vinyl cyanide-based compound may include without limitation acrylonitrile, methacrylonitrile, fumaronitrile, and the like, which may be used alone or may be used as a mixture of two or more kinds thereof. In exemplary embodiments, acrylonitrile may be used.

Examples of the aromatic vinyl-based compound may include without limitation styrene, $C_1$ to $C_{10}$ alkyl-substituted styrene, halogen-substituted styrene, vinyl toluene, vinyl naphthalene, and the like, and combinations thereof.

The thermoplastic resin composition according to exemplary embodiments of the invention may include the acrylic graft copolymer in an amount of about 30 to about 70 wt %, for example about 35 to about 60 wt %, based on 100 wt % of a base resin including the acrylic graft copolymer and the aromatic vinyl-vinyl cyanide copolymer. In some embodiments, the thermoplastic resin composition may include the acrylic graft copolymer in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt %. Further, according to some embodiments of the present invention, the amount of the acrylic graft copolymer can be in a range from about any of the foregoing amounts to about any other of the foregoing amounts.

When the thermoplastic resin composition includes the acrylic graft copolymer in an amount of less than about 30 wt %, weather resistance may be decreased. When the thermoplastic resin composition includes the acrylic graft copolymer in an amount of more than about 70 wt %, molding workability and pigment colorability may be deteriorated.

(B) Aromatic Vinyl-Vinyl Cyanide Copolymer

The aromatic vinyl-vinyl cyanide copolymer can improve impact strength and molding workability in combination with other components in the composition. The aromatic vinyl-vinyl cyanide copolymer may be a copolymer of an aromatic vinyl-based compound and a vinyl cyanide-based compound.

The aromatic vinyl-vinyl cyanide copolymer may include the aromatic vinyl-based compound and the vinyl cyanide-based compound in a weight ratio of about 60:40 to about 90:10, for example, a weight ratio of about 70:30 to about 80:20. In the above-described range, impact strength and fluidity may be improved.

Examples of the aromatic vinyl-based compound may include without limitation styrene, $C_1$ to $C_{10}$ alkyl-substituted styrene, halogen-substituted styrene, vinyl toluene, vinyl naphthalene, and the like, and combinations thereof.

Examples of the alkyl-substituted styrene may include without limitation α-methyl styrene, p-methyl styrene, o-ethyl styrene, m-ethyl styrene, p-ethyl styrene, p-t-butyl styrene, 2,4-dimethyl styrene, and the like, and combinations thereof.

Examples of the vinyl cyanide-based compound may include without limitation acrylonitrile, methacrylonitrile, fumaronitrile, and the like, and combinations thereof.

Examples of the aromatic vinyl-vinyl cyanide copolymer may include without limitation a styrene-acrylonitrile copolymer, an α-methyl styrene-acrylonitrile copolymer, and/or a styrene-α-methyl styrene-acrylonitrile copolymer. In exemplary embodiments, a styrene-acrylonitrile copolymer may be used.

The aromatic vinyl-vinyl cyanide copolymer may have a weight average molecular weight ranging from about 100,000 to about 180,000 g/mol, for example, from about 120,000 to about 160,000 g/mol.

In an exemplary embodiment, the aromatic vinyl-vinyl cyanide copolymer may include a mixture of about 60 to about 80 wt % of an α-methyl styrene-styrene-vinyl cyanide copolymer (B-1) and about 20 to about 40 wt % of a styrene-vinyl cyanide copolymer (B-2).

In some embodiments, the mixture may include the α-methyl styrene-styrene-vinyl cyanide copolymer (B-1) in an amount of about 60, 61, 62, 63, 64, 65, 66, 67, 68, 69, 70, 71, 72, 73, 74, 75, 76, 77, 78, 79, or 80 wt %. Further, according to some embodiments of the present invention, the amount of the α-methyl styrene-styrene-vinyl cyanide copolymer (B-1) can be in a range from about any of the foregoing amounts to about any other of the foregoing amounts.

In some embodiments, the mixture may include the styrene-vinyl cyanide copolymer (B-2) in an amount of about 20, 21, 22, 23, 24, 25, 26, 27, 28, 29, 30, 31, 32, 33, 34, 35, 36, 37, 38, 39, or 40 wt %. Further, according to some embodiments of the present invention, the amount of the styrene-vinyl cyanide copolymer (B-2) can be in a range from about any of the foregoing amounts to about any other of the foregoing amounts.

When an aromatic vinyl-vinyl cyanide copolymer including α-methyl styrene is included in an amount within the above-described range, a balance of physical properties such as excellent workability, weather resistance, thermal resistance, and impact strength, may be obtained.

The thermoplastic resin composition according to exemplary embodiments of the invention may include the aromatic vinyl-vinyl cyanide copolymer in an amount of about 30 to about 70 wt %, for example about 45 to about 65 wt %, based on 100 wt % of a base resin including the acrylic graft copolymer and the aromatic vinyl-vinyl cyanide copolymer. In some embodiments, the thermoplastic resin composition may include the aromatic vinyl-vinyl cyanide copolymer in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt %. Further, according to some embodiments of the present invention, the amount of the aromatic vinyl-vinyl cyanide copolymer can be in a range from about any of the foregoing amounts to about any other of the foregoing amounts.

When the thermoplastic resin composition includes the aromatic vinyl-vinyl cyanide copolymer in an amount of less than about 30 wt %, fluidity may be deteriorated, which can decrease molding workability. When the thermoplastic resin composition includes the aromatic vinyl-vinyl cyanide copolymer in an amount of more than about 70 wt %, gas occurrence may be increased, which can deteriorate weather resistance and impact strength.

(C) Coloring Agent

In exemplary embodiments, a coloring agent can be added to improve weather resistance, pigment colorability, and/or color mixing ability, by combination with other components in the composition, including optionally carbon black.

The coloring agent of the present invention includes an inorganic pigment and an organic pigment.

As the inorganic pigment and the organic pigment, a pigment having a black color may be used alone, and/or a mixture of two or more kinds of pigments having red, green, blue, yellow, violet, and/or black colors may be used.

The inorganic pigment is not limited and can be an inorganic pigment known in the art. Examples of the inorganic pigment may include without limitation oxides including metal elements selected from Fe, Cr, Mn, Cu, Co and/or Ni, titanium oxide, zinc oxide, aluminum metal powder, copper metal powder, stainless steel powder, and the like, and combinations thereof.

The organic pigment is not limited and can be an organic pigment known in the art. Examples of the organic pigment may include without limitation anthraquinone pigments, perylene pigments, phthalocyanine pigments, azo pigments, indigo pigments, dioxazine pigments, quinacridone pigments, isoindolinone pigments, phthalone pigments, and the like, and combinations thereof.

In the present invention, it was found that as the inorganic pigment and the organic pigment are mixed with each other at a predetermined ratio, the b value in chromaticity is changed, and as the b value is decreased, a "dE" value is also decreased, such that weather resistance is improved.

The b value in chromaticity is a yellow-blue value, wherein when the b value is increased, the yellow color becomes remarkable, and when the b value is decreased, the blue color becomes remarkable. At the time of outdoor exposure for a long time, yellowing occurs in the resin by ultraviolet rays and bad weather, wherein the b value becomes gradually increased. When the b value is increased, the "dE" value is also increased, such that weather resistance is deteriorated.

The mixing ratio of the inorganic pigment and the organic pigment of the coloring agent (C) can be a weight ratio of about 1:1 to about 1:4. In exemplary embodiments, the mixing ratio of the inorganic pigment and the organic pigment of the coloring agent (C) can be a weight ratio of about 1:3 to about 1:4. In the above-described range of about 1:1 to about 1:4, the b value is prevented from being increased to thereby decrease the overall dE value, such that weather resistance may be effectively improved.

The thermoplastic resin composition according to exemplary embodiments of the invention may include the coloring agent in an amount of about 0.1 to about 1 part by weight based on about 100 parts by weight of a base resin including the acrylic graft copolymer and the aromatic vinyl-vinyl cyanide copolymer. In some embodiments, the thermoplastic resin composition may include the coloring agent in an amount of about 0.1, 0.2, 0.3, 0.4, 0.5, 0.6, 0.7, 0.8, 0.9, or 1 part by weight. Further, according to some embodiments of the present invention, the amount of the coloring agent can be in a range from about any of the foregoing amounts to about any other of the foregoing amounts.

When the thermoplastic resin composition includes the coloring agent in an amount of less than about 0.1 parts by weight, a problem in implementing color sense may occur. When the thermoplastic resin composition includes the coloring agent in an amount of more than about 1 part by weight, impact strength may decrease.

(D) Carbon Black

A carbon black according to an exemplary embodiment of the present invention may be added to improve weather resistance, pigment colorability, and/or color mixing ability, by combination with the coloring agent in the composition. The carbon black of the present invention is not limited and can be any carbon black known in the art. Examples of the carbon black may include without limitation ketjen black, acetylene black, furnace black, channel black, and the like, and combinations thereof.

The carbon black of the present invention can have an average particle size of about 10 to about 50 nm and a specific surface area of about 100 to about 300 $m^2/g$. In the above-described range, the carbon black may improve weather resistance and/or pigment colorability together with the inorganic pigment and the organic pigment included at a predetermined ratio.

The carbon black of the present invention may be used alone, or may be mixed with the aromatic vinyl-vinyl cyanide copolymer to be used as a masterbatch type.

When using the carbon black as the masterbatch type, the masterbatch may include the aromatic vinyl-vinyl cyanide copolymer in an amount of about 30 to about 70 wt %, and may include the carbon black in an amount of about 30 to about 70 wt %. In exemplary embodiments, the masterbatch may include the aromatic vinyl-vinyl cyanide copolymer in an amount of about 50 to about 70 wt %, and the masterbatch may include the carbon black in an amount of about 30 to about 50 wt %.

In some embodiments, the masterbatch may include the aromatic vinyl-vinyl cyanide copolymer in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt %. Further, according to some embodiments of the present invention, the amount of the aromatic vinyl-vinyl cyanide copolymer can be in a range from about any of the foregoing amounts to about any other of the foregoing amounts.

In some embodiments, the masterbatch may include the carbon black in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt %. Further, according to some embodiments of the present invention, the amount of the carbon black can be in a range from about any of the foregoing amounts to about any other of the foregoing amounts.

When using the masterbatch including the aromatic vinyl-vinyl cyanide copolymer and carbon black in amounts within the above-described range, dispersibility of the carbon black and the coloring agent in the thermoplastic resin composition may be improved to enhance molding workability and further improve weather resistance and/or pigment colorability.

The thermoplastic resin composition according to exemplary embodiments of the invention may include carbon black in an amount of about 1 to about 5 parts by weight, for example about 1 to about 3 parts by weight, based on about 100 parts by weight of a base resin including the acrylic graft copolymer and the aromatic vinyl-vinyl cyanide copolymer. In some embodiments, the thermoplastic resin composition may include carbon black in an amount of about 1, 2, 3, 4, or 5 parts by weight. Further, according to some embodiments of the present invention, the amount of carbon black can be in a range from about any of the foregoing amounts to about any other of the foregoing amounts.

When the thermoplastic resin composition includes carbon black in an amount of less than about 1 part by weight, a problem may occur in black chromaticity. When the thermoplastic resin composition includes carbon black in an amount of more than about 5 parts by weight, impact strength may decrease.

The thermoplastic resin composition of the present invention may further include one or more general additives depending on desired usages in addition to the above components. Examples of the additives may include without limitation antibacterial agents, heat stabilizers, antioxidants, release agents, light stabilizers, inorganic additives, surfactants, coupling agents, plasticizers, compatibilizers, lubricants, antistatic agents, coloring agents, pigments, dyes, flame retardants, flame retardant aids, dripping prevention agents, weathering stabilizers, ultraviolet absorbers, ultraviolet blockers, and the like, and mixtures thereof.

The additive may be included in an amount appropriately selected so that physical properties of the thermoplastic resin composition are not inhibited. In exemplary embodiments, the thermoplastic resin composition may include the additive in an amount of about 20 parts by weight or less, for example, about 0.1 to about 15 parts by weight, based on about 100 parts by weight of a base resin including the acrylic graft copolymer (A) and the aromatic vinyl-vinyl cyanide copolymer (B).

The thermoplastic resin composition of the present invention may be prepared by known methods. For example, each component and optional additive(s) can be mixed by a Henschel mixer, a V blender, a tumbler blender, a ribbon blender, and the like, followed by melt-extrusion by using a single screw extruder or a twin-screw extruder at a temperature of about 150 to about 300° C., thereby preparing a pellet form. In exemplary embodiments, the pellet form may be prepared by extrusion under conditions including a temperature of about 180 to about 280° C., a screw rotation rate of about 300 to about 600 rpm, and a self-supply rate of about 60 to about 600 kg/hr, using a twin-screw extruder satisfying L/D=29 and Φ=45 mm.

According to another exemplary embodiment of the present invention, there is provided a molded article that can have improved weather resistance, manufactured by molding the above-described thermoplastic resin composition. The molded articles may be manufactured by various processes known in the art, such as but not limited to injection-molding, double injection-molding, blow molding, extrusion molding, heat molding, and the like, using the thermoplastic resin composition.

When the ratio between the inorganic pigment and the organic pigment is represented by the following Equation 2, the following Equations 3 to 5 may be simultaneously satisfied:

$$0.25 \leq P_I/P_O \leq 1.0 \quad \text{[Equation 2]}$$

wherein in Equation 2, $P_I$ is a content (amount) of the inorganic pigment (parts by weight), and $P_O$ is a content (amount) of the organic pigment (parts by weight)), $$dL=|La-Lb| \leq 1.5 \quad \text{[Equation 3]}$$

$$da=|Aa-Ab| \leq 1.5 \quad \text{[Equation 4]}$$

$$db=|Ba-Bb| \leq 2.0 \quad \text{[Equation 5]}$$

wherein in Equation 3, La is an "L" value measured by a spectrophotometer after a weather resistance test and Lb is an "L" value measured by a spectrophotometer before a weather resistance test, in Equation 4, Aa is an "a" value measured by a spectrophotometer after a weather resistance test and Ab is an "a" value measured by a spectrophotometer before a weather resistance test, and in Equation 5, Ba is a "b" value measured by a spectrophotometer after a weather resistance test and Bb is a "b" value measured by a spectrophotometer before a weather resistance test.

In addition, in the molded article, a "dE" value of the following Equation 1 may be less than about 3:

$$dE=\sqrt{(dL)^2+(da)^2+(db)^2} \quad \text{[Equation 1]}$$

wherein in Equation 1, dL is a variation of luminance, da is a variation of red green values, and db is a variation of yellow blue values, all of which are measured by a spectrophotometer.

In the thermoplastic resin composition of the present invention, the b value in chromaticity may be freely controlled depending on the ratio of the carbon black and the inorganic pigment and the organic pigment, and therefore, the "dE" value can be decreased to improve weather resistance.

Therefore, it may be appreciated that even though a base resin for improving weather resistance is not adjusted in the molded article of the present invention, or the additives for improving weather resistance are not separately added thereto, desirable color may be implemented and weather resistance may be improved without decreasing mechanical properties by a simple method of controlling the ratio between the inorganic pigment and the organic pigment. Accordingly, the molded article may be effectively used, for example, as automobile exterior materials requiring these properties.

Hereinafter, the following Examples will be provided in order to describe the present invention in more detail. However, the present invention is not limited to these Examples.

Measurement of Physical Properties

1) Weather Resistance Evaluation

Accelerated weather resistance is evaluated for about 400 hours under the following conditions by using Metaling Vertical Weather Meter MV-3000 manufactured by Suga Test Instruments Co., Ltd.

Light Source: Metal halide lamp
Irradiance: 55 W/m²
Temp.: 38° C.
Black panel temp.: 63° C.
Relative humidity: 50%
Test Duration (1 cycle, 2 phases): 2 hrs/1 cycle 2) Chromaticity Measurement (dL, Da, Db)

"L" values, "a" values, and "b" values of samples before and after performing the weather resistance test are measured by using a Minolta (CM-2500C) colorimeter to calculate "dE" values by the following Equation 1:

$$dE=\sqrt{(dL)^2+(da)^2+(db)^2} \quad \text{[Equation 1]}$$

wherein in Equation 1, dL is a variation of luminance, da is a variation of red green values, and db is a variation of yellow blue values, all of which are measured by a spectrophotometer.

3) Izod Impact Strength (Unit: kgf·cm/cm)

Izod impact strength is measured under about 1/8" thickness of notched condition, based on ASTM D256.

Specifications of each component used in the following Examples and Comparative Examples are as follows:

(A-1) Acrylic Graft Copolymer

A g-ASA resin having a core-shell form and obtained by emulsion graft polymerization of an acrylic rubber-like copolymer with about 33.5 wt % of styrene and about 16.5 wt % of acrylonitrile, is used, wherein the acrylic rubber-like copolymer is obtained by copolymerizing about 42.5 wt % of butylacrylate having an average particle size of about 0.18 μm and about 7.5 wt % of styrene.

(A-2) Acrylic Graft Copolymer

A g-ASA resin having a core-shell form and obtained by emulsion graft polymerization of about 60 wt % of butylacrylate having an average particle size of about 0.32 μm, with about 26.8 wt % of styrene and about 13.2 wt % of acrylonitrile, is used.

(B-1) Aromatic Vinyl-Vinyl Cyanide Copolymer

An alpha-methylstyrene-styrene-acrylonitrile copolymer (SAN) resin obtained by copolymerization of about 54 wt % of alpha-methylstyrene, about 27 wt % of acrylonitrile and about 19 wt % of styrene, and having a weight average molecular weight of about 160,000 g/m, is used.

(B-2) Aromatic Vinyl-Vinyl Cyanide Copolymer

A styrene-acrylonitrile copolymer (SAN) resin obtained by copolymerization of about 32 wt % of acrylonitrile and about 68 wt % of styrene, and having a weight average molecular weight of about 120,000 g/m, is used.

(C-1) Inorganic Pigment

Iron Oxide Red 878A (red 114) manufactured by LANXESS Company is used.

(C-2) Inorganic Pigment

YELLOW NV 9118S manufactured by Tomatec Company is used.

(C-3) Organic Pigment

PELIOGEN RED K3911 HD manufactured by BASF Company is used.

(C-4) Organic Pigment

PALIOTOL YELLOW K2270 manufactured by BASF Company is used.

(C-5) Organic Pigment

Pigment Yellow 183 (Seramol Yellow XF) manufactured by DYNASTY CHEMICALS is used.

(D-1) Carbon Black

HI BLACK 30B manufactured by Evonik Carbon Black Korea Co., Ltd., having an average particle size of about 23 nm and a specific surface area of about 123 m²/g is used.

(D-2) Carbon Black MasterBatch

A carbon black masterbatch is prepared by mixing about 40 wt % of the carbon black (D-1) with about 60 wt % of a styrene-acrylonitrile copolymer (SAN) resin, the SAN resin obtained by copolymerization of about 32 wt % of acrylonitrile and about 68 wt % of styrene and having a weight average molecular weight of about 120,000 g/mol.

EXAMPLE 1

As described in the following Table 1, a thermoplastic resin composition for improving weather resistance is prepared by mixing about 0.12 parts by weight of an inorganic pigment (C-1), about 0.06 parts by weight of an organic pigment (C-3), about 0.4 parts by weight of an organic pigment (C-5), about 2.5 parts by weight of carbon black masterbatch (D-2), about 0.4 parts by weight of an internal lubricant (Lubricant(s); HI-LUB B-50) and about 1.3 parts by weight of a weathering stabilizer (UV stabilizer; LIGHT STABILITYA, UV-327-1) based on 100 parts by weight of a base resin including about 24 wt % of an acrylic graft copolymer (A-1), about 17 wt % of an acrylic graft copolymer (A-2), about 44 wt % of an aromatic vinyl-vinyl cyanide copolymer (B-1) and about 15 wt % of an aromatic vinyl-vinyl cyanide copolymer (B-2).

The thermoplastic resin composition is mixed in a general mixer, followed by extrusion by using a twin-screw extruder satisfying L/D=29 and Φ=45 mm, to prepare a pellet. The prepared pellet is dried in a dehumidifying dryer at about 80° C. for about 2 hours before injection molding, and then a sample having a size of 9 cm*5 cm*0.2 cm is prepared by using a 60 oz injection machine which is set at a cylinder temperature of about 250° C. and a mold temperature of about 60° C., and physical properties thereof are measured. The measured physical properties of the sample are shown in the following Table 2.

EXAMPLE 2

As described in the following Table 1, the same method as Example 1 above is conducted except for using a thermoplastic resin composition for improving weather resistance obtained by mixing about 0.08 parts by weight of an inorganic pigment (C-1), about 0.055 parts by weight of an organic pigment (C-3), about 0.2 parts by weight of an organic pigment (C-4), about 2.5 parts by weight of carbon black masterbatch (D-2), about 0.4 parts by weight of an internal lubricant (Lubricant(s); HI-LUB B-50) and about 1.3 parts by weight of a weathering stabilizer (UV stabilizer; LIGHT STABILITYA, UV-327-1) based on 100 parts by weight of a base resin including about 24 wt % of an acrylic graft copolymer (A-1), about 17 wt % of an acrylic graft copolymer (A-2), about 44 wt % of an aromatic vinyl-vinyl cyanide copolymer (B-1) and about 15 wt % of an aromatic vinyl-vinyl cyanide copolymer (B-2), and physical properties thereof are measured and shown in the following Table 2.

EXAMPLE 3

As described in the following Table 1, the same method as Example 1 above is conducted except for using a thermoplastic resin composition obtained by mixing about 0.12 parts by weight of an inorganic pigment (C-1), about 0.2 parts by weight of an inorganic pigment (C-2), about 0.055 parts by weight of an organic pigment (C-3), about 0.3 parts by weight of an organic pigment (C-5), about 0.3 parts by weight of a carbon black powder (D-1), about 2.5 parts by weight of carbon black masterbatch (D-2), about 0.4 parts by weight of an internal lubricant (Lubricant(s); HI-LUB B-50) and about 1.3 parts by weight of a weathering stabilizer (UV stabilizer; LIGHT STABILITYA, UV-327-1) based on 100 parts by weight of a base resin including about 24 wt % of an acrylic graft copolymer (A-1), about 17 wt % of an acrylic graft copolymer (A-2), about 44 wt % of an aromatic vinyl-vinyl cyanide copolymer (B-1) and about 15 wt % of an aromatic vinyl-vinyl cyanide copolymer (B-2), and physical properties thereof are measured and shown in the following Table 2.

COMPARATIVE EXAMPLE 1

As described in the following Table 1, the same method as Example 1 above is conducted except for not using the additive (C) and the carbon black (D), but using a thermoplastic resin composition for improving weather resistance obtained by mixing about 0.4 parts by weight of an internal lubricant (Lubricant(s); HI-LUB B-50) and about 1.3 parts by weight of a weathering stabilizer (UV stabilizer; LIGHT STABILITYA, UV-327-1) based on 100 parts by weight of a base resin including about 24 wt % of an acrylic graft copolymer (A-1), about 17 wt % of an acrylic graft copolymer (A-2), about 44 wt % of an aromatic vinyl-vinyl cyanide copolymer (B-1) and about 15 wt % of an aromatic vinyl-vinyl cyanide copolymer (B-2), and physical properties thereof are measured and shown in the following Table 2.

COMPARATIVE EXAMPLE 2

As described in the following Table 1, the same method as Example 1 above is conducted except for not using the organic pigment in the additive (C), but using a thermoplastic resin composition for improving weather resistance obtained by mixing about 0.1 parts by weight of an inorganic pigment (C-1), about 0.8 parts by weight of an inorganic pigment (C-2), about 2.5 parts by weight of carbon black masterbatch (D-2), about 0.4 parts by weight of internal lubricant (Lubricant(s); HI-LUB B-50) and about 1.3 parts by weight of a weathering stabilizer (UV stabilizer; LIGHT STABILITYA, UV-327-1) based on 100 parts by weight of a base resin including about 24 wt % of an acrylic graft copolymer (A-1), about 17 wt % of an acrylic graft copolymer (A-2), about 44 wt % of an aromatic vinyl-vinyl cyanide copolymer (B-1) and about 15 wt % of an aromatic vinyl-vinyl cyanide copolymer (B-2), and physical properties thereof are measured and shown in the following Table 2.

COMPARATIVE EXAMPLE 3

As described in the following Table 1, the same method as Example 1 above is conducted except for changing the mixing ratio between the inorganic pigment and the organic pigment in the additive (C) and using a thermoplastic resin composition for improving weather resistance obtained by mixing about 0.3 parts by weight of an inorganic pigment (C-1), about 0.4 parts by weight of an inorganic pigment (C-2), about 0.35 parts by weight of an organic pigment (C-5), about 2.5 parts by weight of carbon black masterbatch (D-2), about 0.4 parts by weight of an internal lubricant (Lubricant(s); HI-LUB B-50) and about 1.3 parts by weight of a weathering stabilizer (UV stabilizer; LIGHT STABILITYA, UV-327-1) based on 100 parts by weight of a base resin including about 24 wt % of an acrylic graft copolymer (A-1), about 17 wt % of an acrylic graft copolymer (A-2), about 44 wt % of an aromatic vinyl-vinyl cyanide copolymer (B-1) and about 15 wt % of an aromatic vinyl-vinyl cyanide copolymer (B-2), and physical properties thereof are measured and shown in the following Table 2.

TABLE 1

| | | | Example | | | Comparative Example | | |
|---|---|---|---|---|---|---|---|---|
| | | | 1 | 2 | 3 | 1 | 2 | 3 |
| Acrylic Graft Copolymer | | 1 | 24 | 24 | 24 | 24 | 24 | 24 |
| | | 2 | 17 | 17 | 17 | 17 | 17 | 17 |
| Aromatic vinyl-Vinyl cyanide Copolymer | | 1 | 44 | 44 | 44 | 44 | 44 | 44 |
| | | 2 | 15 | 15 | 15 | 15 | 15 | 15 |
| Coloring Agent | Inorganic Pigment | 1 | 0.12 | 0.08 | 0.12 | — | 0.1 | 0.3 |
| | | 2 | — | — | 0.2 | — | 0.8 | 0.4 |
| | Organic Pigment | 3 | 0.06 | 0.055 | 0.055 | — | — | — |
| | | 4 | — | 0.2 | — | — | — | — |
| | | 5 | 0.4 | — | 0.3 | — | — | 0.35 |
| Carbon Black | Powder | 1 | — | — | 0.3 | — | — | — |
| | Master Batch | 2 | 2.5 | 2.5 | 2.5 | — | 2.5 | 2.5 |
| Pigment Mixing Ratio | Sum of Inorganic Pigment | | 0.12 | 0.08 | 0.32 | — | 0.9 | 0.7 |
| | Sum of Organic Pigment | | 0.46 | 0.255 | 0.355 | — | — | 0.35 |
| | Inorganic Pigment Ratio | | 1 | 1 | 1 | — | 1 | 2 |
| | Organic Pigment Ratio | | 3.8 | 3.2 | 1.1 | — | 0 | 1 |

TABLE 2

| | | Example | | | Comparative Example | | |
|---|---|---|---|---|---|---|---|
| | | 1 | 2 | 3 | 1 | 2 | 3 |
| Weather Resistance (400 hr) | dL | 1.12 | 1.00 | 0.86 | 1.99 | 0.84 | −0.19 |
| | da | 0.26 | 0.17 | 0.18 | 1.85 | 0.25 | 0.13 |
| | db | 1.29 | 1.34 | 1.55 | 5.36 | 2.76 | 2.11 |
| | dE | 1.73 | 1.68 | 1.78 | 6.01 | 2.78 | 2.12 |
| Impact Strength (kgf · cm/cm) | | 16.9 | 17.3 | 17.5 | 23.8 | 17.1 | 15.3 |

It can be appreciated from Table 2 above that in Examples 1 to 3 according to the present invention, the db values are low while mechanical properties such as impact strength, and the like, are not largely deteriorated, such that the overall dE values are excellent, as compared to the Comparative Examples. In addition, it can be appreciated from FIG. 1 that after about 300 hours of the weather resistance test, in Examples 1 to 3, the "dE" values decrease, such that weather resistance improves. Meanwhile, in Comparative Example 2, the "dE" values rapidly increase, such that weather resistance significantly decreases.

Meanwhile, it can be appreciated that Comparative Example 1 did not include the carbon black and the inorganic/organic pigment, such that the db value is remarkably high, and the overall dE value is decreased.

It can be appreciated that as compared to Comparative Example 1, Comparative Example 2 did not use the organic pigment but used only the carbon black and the inorganic pigment, such that weather resistance and impact strength are partially improved, but the db value is increased, which is not appropriate for being manufactured as a product.

In addition, it can be appreciated that Comparative Example 3 has a mixing ratio between the inorganic pigment and the organic pigment which is outside of the range of the present invention, such that the db value is increased, and impact strength is deteriorated, which is not appropriate for being manufactured as a product.

Therefore, it can be appreciated from the Examples and the Comparative Examples that as the content of the inorganic pigment is increased, the b value is increased in a plus (+) direction, such that yellow color became remarkable, and as the content of the organic pigment is increased, the b value is increased in a minus (−) direction, such that blue color became remarkable. In addition, it can be appreciated that when the inorganic pigment and the organic pigment are mixed at a predetermined ratio to be used, the b value can be controlled, stabilization can be provided at the time of evaluating weather resistance for a long time, and weather resistance can be controlled.

With the thermoplastic resin composition for improving weather resistance according to the present invention, deterioration of physical properties such as impact strength, and the like, may be minimized, the chromaticity "b" value may be controlled to decrease dE only by controlling a mixing ratio between the inorganic pigment and the organic pigment, such that weather resistance may be improved, and excellent weather resistance may be maintained for a long period of time.

The thermoplastic resin composition can include masterbatch carbon black, such that dispersibility of pigment may be improved to provide improved pigment colorability and color mixing ability.

Therefore, the thermoplastic resin composition can be suitable for automobile exterior materials, and the like, simultaneously requiring uniform chromaticity, excellent mechanical property, and weather resistance.

Hereinabove, although the present invention is described by the specific exemplary embodiments, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described exemplary embodiments, and not only the following claims but also all modified equally or equivalently to the claims are intended to fall within the scope and spirit of the invention.

What is claimed is:

1. A thermoplastic resin composition for improving weather resistance comprising:
   a base resin including about 30 to about 70 wt % of (A) an acrylic graft copolymer; and about 70 to about 30 wt % of (B) an aromatic vinyl-vinyl cyanide copolymer; and
   about 0.1 to about 1 part by weight based on about 100 parts by weight of the base resin of (C) a coloring agent including an inorganic pigment and an organic pigment,
   wherein the inorganic pigment and the organic pigment are present in a weight ratio of inorganic pigment:organic pigment of about 1:1 to about 1:4,
   wherein the inorganic pigment and the organic pigment both include a pigment in the same color family and wherein at least one of the inorganic pigment and the organic pigment further includes at least one additional pigment in a different color family.

2. The thermoplastic resin composition for improving weather resistance of claim 1, further comprising: (D) carbon black.

3. The thermoplastic resin composition for improving weather resistance of claim 2, comprising the coloring agent (C) in an amount of about 0.1 to about 1 part by weight and the carbon black (D) in an amount of about 1 to about 5 parts by weight, based on about 100 parts by weight of a base resin including about 30 to about 70 wt % of the acrylic graft copolymer (A) and about 70 to about 30 wt % of the aromatic vinyl-vinyl cyanide copolymer (B).

4. The thermoplastic resin composition for improving weather resistance of claim 3, wherein the carbon black (D) is a masterbatch including about 30 to about 70 wt % of the aromatic vinyl-vinyl cyanide copolymer and about 30 to about 70 wt % of the carbon black mixed with each other.

5. The thermoplastic resin composition for improving weather resistance of claim 2, wherein the carbon black (D) has an average particle size of about 10 to about 50 nm, and a specific surface area of about 100 to about 300 $m^2/g$.

6. The thermoplastic resin composition for improving weather resistance of claim 1, wherein the inorganic pigment and the organic pigment are present in a weight ratio of inorganic pigment:organic pigment of about 1:1.1 to about 1:4.

7. The thermoplastic resin composition for improving weather resistance of claim 1, wherein the acrylic graft copolymer (A) is an acrylonitrile-styrene-acrylate graft copolymer (g-ASA) obtained by graft-polymerization of about 40 to about 60 wt % of an acrylic rubber-like polymer and about 40 to about 60 wt % of a mixture including an aromatic vinyl-based compound and a vinyl cyanide-based compound.

8. The thermoplastic resin composition for improving weather resistance of claim 1, wherein the aromatic vinyl-vinyl cyanide copolymer (B) comprises a styrene-acrylonitrile copolymer, an α-methyl styrene-acrylonitrile copolymer, a styrene-α-methyl styrene-acrylonitrile copolymer, or a combination thereof.

9. The thermoplastic resin composition for improving weather resistance of claim 1, wherein:
   the inorganic pigment comprises an oxide including a metal element Fe, Cr, Mn, Cu, Co, or Ni, titanium oxide, zinc oxide, aluminum metal powder, copper metal powder, stainless steel powder, or a combination thereof, and
   the organic pigment comprises anthraquinone pigment, perylene pigment, phthalocyanine pigment, azo pigment, indigo pigment, dioxazine pigment, quinacridone pigment, isoindolinone pigment, phthalone pigment, or a combination thereof.

10. The thermoplastic resin composition for improving weather resistance of claim 1, comprising the inorganic pigment and the organic pigment in a weight ratio represented by the following Equation 2, wherein in a molded article manufactured therefrom the following Equations 3 to 5 are simultaneously satisfied:

$$0.25 \leq P_I/P_O < 1.0 \qquad \text{[Equation 2]}$$

wherein in Equation 2, $P_I$ is a content of the inorganic pigment in parts by weight, and $P_O$ is a content of the organic pigment in parts by weight, $$dL = |La - Lb| \leq 1.5 \qquad \text{[Equation 3]}$$

$$da = |Aa - Ab| \leq 1.5 \qquad \text{[Equation 4]}$$

$$db = |Ba - Bb| \leq 2.0 \qquad \text{[Equation 5]}$$

wherein in Equation 3, La is an "L" value measured by a spectrophotometer after a weather resistance test and Lb is an "L" value measured by a spectrophotometer before a weather resistance test, in Equation 4, Aa is an "a" value measured by a spectrophotometer after a weather resistance test and Ab is an "a" value measured by a spectrophotometer before a weather resistance test, and in Equation 5, Ba is a "b" value measured by a spectrophotometer after a weather resistance test and Bb is a "b" value measured by a spectrophotometer before a weather resistance test.

11. The thermoplastic resin composition for improving weather resistance of claim 1, wherein the coloring agent including the inorganic pigment and the organic pigment in a weight ratio inorganic pigment:organic pigment of about 1:3 to about 1:4.

12. The thermoplastic resin composition for improving weather resistance of claim 1, wherein the inorganic pigment and the organic pigment both include a red pigment and wherein at least one of the inorganic pigment and the organic pigment further includes a yellow pigment.

13. The thermoplastic resin composition for improving weather resistance of claim 12, further comprising (D) carbon black in an amount of about 1 to about 5 parts by weight, based on about 100 parts by weight of the base resin.

14. The thermoplastic resin composition for improving weather resistance of claim 13, wherein in a molded article manufactured therefrom are simultaneously satisfies the following Equations 3 to 5

$$dL = |La - Lb| \leq 1.5 \qquad \text{[Equation 3]}$$

$$da = |Aa - Ab| \leq 1.5 \qquad \text{[Equation 4]}$$

$$db = |Ba - Bb| \leq 2.0 \qquad \text{[Equation 5]}$$

wherein in Equation 3, La is an "L" value measured by a spectrophotometer after a weather resistance test and Lb is an "L" value measured by a spectrophotometer before a weather resistance test, in Equation 4, Aa is an "a" value measured by a spectrophotometer after a weather resistance test and Ab is an "a" value measured by a spectrophotometer before a weather resistance test, and in Equation 5, Ba is a "b" value measured by a spectrophotometer after a weather resistance test and Bb is a "b" value measured by a spectrophotometer before a weather resistance test.

15. A molded article manufactured from the thermoplastic resin composition for improving weather resistance according to claim 1.

16. The molded article of claim 15, comprising an inorganic pigment and an organic pigment in a weight ratio represented by the following Equation 2, wherein the following Equations 3 to 5 are simultaneously satisfied:

$$0.25 \leq P_I/P_O < 1.0 \qquad \text{[Equation 2]}$$

wherein in Equation 2, $P_I$ is a content of the inorganic pigment (parts by weight), and $P_O$ is a content of the organic pigment (parts by weight), $$dL = |La - Lb| \leq 1.5 \qquad \text{[Equation 3]}$$

$$da = |Aa - Ab| \leq 1.5 \qquad \text{[Equation 4]}$$

$$db = |Ba - Bb| \leq 2.0 \qquad \text{[Equation 5]}$$

wherein in Equation 3, La is an "L" value measured by a spectrophotometer after a weather resistance test and Lb is an "L" value measured by a spectrophotometer before a weather resistance test, in Equation 4, Aa is an "a" value measured by a spectrophotometer after a weather resistance test and Ab is an "a" value measured by a spectrophotometer before a weather resistance test, and in Equation 5, Ba is a "b" value measured by a spectrophotometer after a weather resistance test and Bb is a "b" value measured by a spectrophotometer before a weather resistance test.

17. The molded article of claim 15, wherein the molded article has a "dE" value of less than about 3 measured in accordance with the following Equation 1:

$$dE = \sqrt{(dL)^2 + (da)^2 + (db)^2} \qquad \text{[Equation 1]}$$

wherein in Equation 1, dL is a variation of luminance, da is a variation of red green values, and db is a variation of yellow blue values, all of which are measured by a spectrophotometer.

18. A molded article manufactured from the thermoplastic resin composition for improving weather resistance according to claim 2.

* * * * *

UNITED STATES PATENT AND TRADEMARK OFFICE
CERTIFICATE OF CORRECTION

PATENT NO. : 9,951,216 B2
APPLICATION NO. : 15/630260
DATED : April 24, 2018
INVENTOR(S) : Ji Eun Park et al.

It is certified that error appears in the above-identified patent and that said Letters Patent is hereby corrected as shown below:

In the Specification

Column 10, delete Line 61 and insert:
--2) Chromaticity Measurement (dL, da, db)--

Signed and Sealed this
Thirtieth Day of October, 2018

Andrei Iancu
*Director of the United States Patent and Trademark Office*